(Model.) 3 Sheets—Sheet 1.

T. S. SMITH.
SASH FASTENER.

No. 403,391. Patented May 14, 1889.

Witnesses:
Jas. E. Hutchinson
Henry C. Hazard

Inventor
Thomas S. Smith
by Prindle and Russell
his attorneys (Model.)

T. S. SMITH.
SASH FASTENER.

No. 403,391. Patented May 14, 1889.

3 Sheets—Sheet 2.

Witnesses:
Jas. E. Hutchinson.
Henry C. Hazard.

Inventor:
Thomas S. Smith
by Prindle and Russell
his attorneys (Model.) 3 Sheets—Sheet 3.

T. S. SMITH.
SASH FASTENER.

No. 403,391. Patented May 14, 1889.

Witnesses:
Jas. E. Hutchinson
Henry C. Hazard

Inventor:
Thomas S. Smith
by Prindle and Russell
his attorneys

UNITED STATES PATENT OFFICE.

THOMAS S. SMITH, OF WASHINGTON, DISTRICT OF COLUMBIA, ASSIGNOR TO HOBART B. IVES & CO., OF NEW HAVEN, CONNECTICUT.

SASH-FASTENER.

SPECIFICATION forming part of Letters Patent No. 403,391, dated May 14, 1889.

Application filed February 3, 1888. Serial No. 262,840. (Model.)

*To all whom it may concern:*

Be it known that I, THOMAS S. SMITH, of Washington, in the District of Columbia, have invented certain new and useful Improvements in Sash-Fasteners; and I do hereby declare that the following is a full, clear, and exact description thereof, reference being had to the accompanying drawings, in which—

Figure 1:
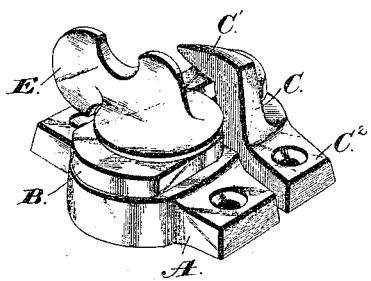
Figure 2:
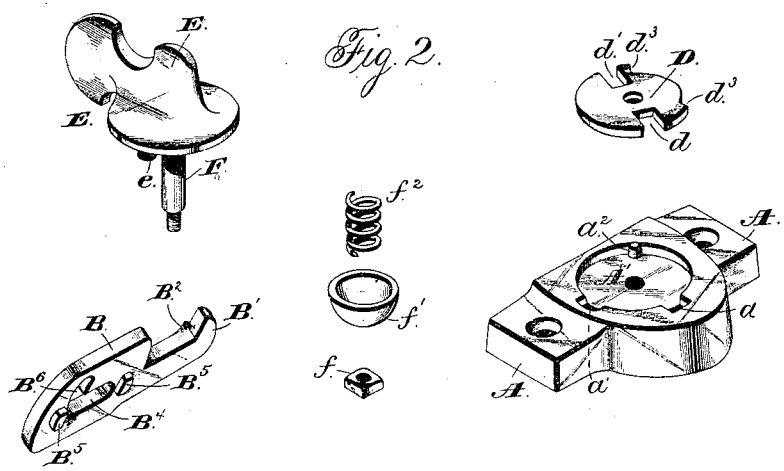
Figure 3:
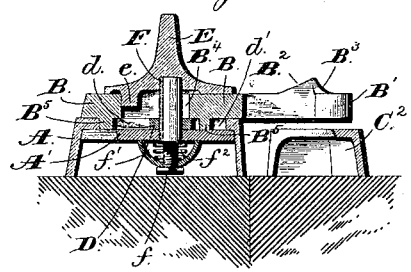
Figure 4:
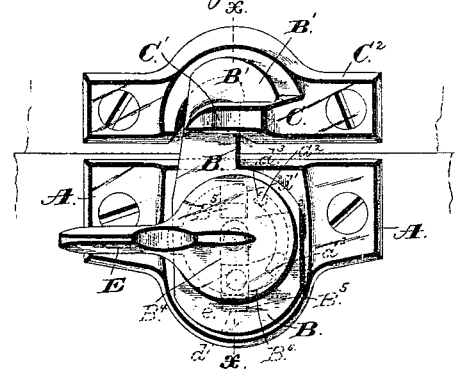
Figure 5:
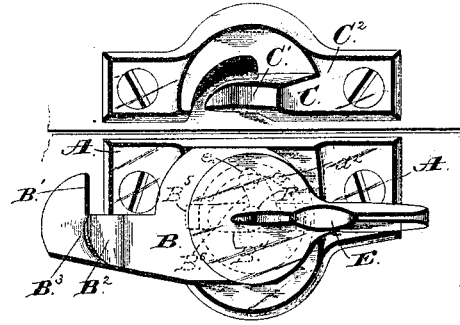
Figure 6:
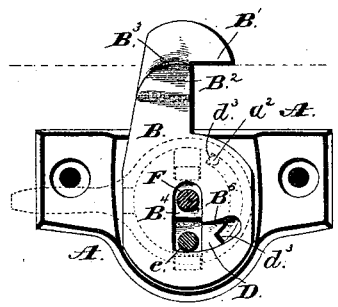
Figure 7:
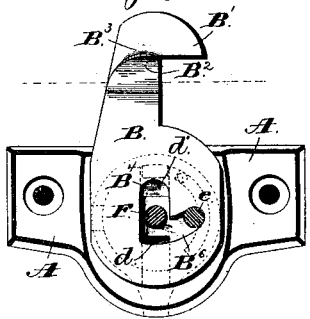
Figure 8:
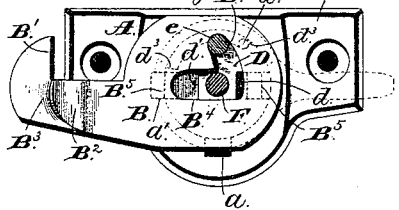
Figure 9:
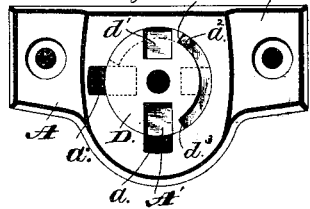
Figure 10:
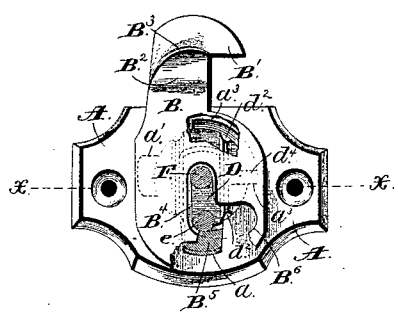
Figure 11:
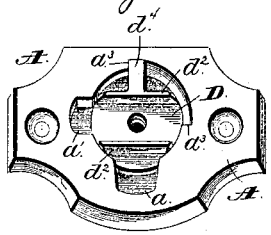
Figure 12:
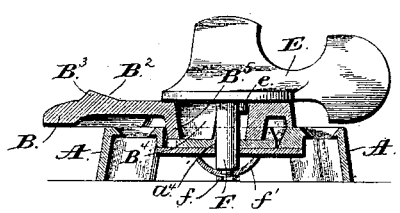
Figure 13:
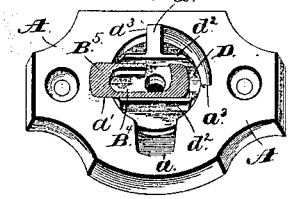
Figure 14:
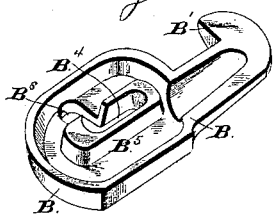

Figure 1 shows a perspective view of my sash-fastener in locking position; Fig. 2, a perspective view of the parts of the fastener separated from each other; Fig. 3, a view of a vertical section of the fastener on line $x\,x$ of Fig. 4; Fig. 4, a plan view of my fastener with the parts in sash-locking position; Fig. 5, a plan view of fastener with the parts in open position; Fig. 6, a plan view of the fastener with the operating knob or handle removed, the parts being in locking position; Fig. 7, a similar view of the fastener with the parts in position as when the latch is cammed out preparatory to being swung around into its open position; Fig. 8, a similar view of the fastener, showing the parts in position as when the latch is locked open; Fig. 9, a plan view of the base and turn-table or carrying-plate; Fig. 10, a plan view of another form of my fastener with the operating knob or handle removed; Fig. 11, a detail perspective view of the base and turn-table or carrying-plate; Fig. 12, a view of a vertical section of this form of fastener on line $x\,x$ of Fig. 10, with latch thrown open; Fig. 13, a perspective view of the base and turn-table or carrying-plate with the guide-piece on the latch, as when the fastener is locked open; and Fig. 14, a detail perspective view of the lower side of the latch.

Letters of like name and kind refer to like parts in each of the figures.

The object of my invention to provide an improved sash-fastener; and to this end my invention consists in the fastener and in the construction, arrangement, and combination of the parts thereof, as hereinafter specified.

My invention relates to that class of sash fasteners or locks for the meeting-rails of sashes in which a swinging and reciprocating latch on one sash-rail engages a suitable stump-pin or keeper on the other sash-rail. The latch part of the fastener is usually attached to the upper rail of the lower sash, and the keeper to the lower rail of the upper sash; and I have shown my fastener as adapted for this relative arrangement of parts; but I do not limit myself to any such arrangement, as the latch part of the fastener could be arranged on the upper sash and the keeper on the lower. In such case the hooked form of keeper shown in the drawings would not be necessary, and the incline or cam-lug shown on top of the latch could be put on the lower side thereof to engage a shoulder or surface at the base of the keeper-stud or on the plate by which the keeper is attached to the sash.

In the drawings, A designates the base of the latch portion of my fastener. It is shown as provided with screw-holes for its attachment to the sash-rail by means of screws, but can be fastened or fixed in place in any desired way. Upon this base is supported the swinging and longitudinally-moving latch B, provided at its outer end with the usual hook, B', for engaging the keeper or stud C. Such keeper is shown as hooked or provided with a horizontal arm or projection, C', under which the latch B comes when it is brought into engagement with the keeper, and as provided with a base or plate, $C^2$, by which it can be attached to the sash-rail. The latch B is at or near its outer hooked end provided with a cam-face or incline, $B^2$. As shown, this cam-face inclines upwardly and outwardly from the top of the latch, and is on the inner side of a lug, $B^3$, on the latch-top. The lug is in such position that as the latch is drawn inward, after being swung into engagement with the keeper, the incline $B^2$ will engage and ride under the hook-arm or side projection, C', of the keeper C, for a purpose to be set forth fully hereinafter. The base A is in its upper face, just below the main or pivotal portion of latch B, provided with the recess A', circular in general form, and with the two offsets or notches $a$ and $a'$ in the walls of the recess. Of these offsets the one $a$ is at the rear side of the recess, or that side toward which the latch is moved when it is drawn inward after being swung into engagement with its keeper. The other notch or offset, $a'$, is situated at one side of the recess at a point about a quarter-way around the circle of the recess from offset or notch $a$. This offset $a'$ is to be placed on one side or the other of the recess $A'$, according as the latch is to have an outward or inward movement after it has been swung open—that is, it is to be on the side of the recess toward which the latch is to move in its longitudinal movement after its swing.

In the drawings the offset $a'$ is shown at the left-hand side of the recess $A'$, as the latch in the fastener illustrated is moved outward after being swung open.

The latch B is provided with the usual longitudinal slot, $B^4$, and on its under side with one or more guide lugs or projections, $B^5$. In Figs. 2 to 9, inclusive, said latch is shown provided with two separate guiding projections or lugs in line with and at opposite ends of the slot $B^4$, while in Figs. 10, 12, and 14 the latch-guide is shown as consisting of an oblong piece or block, $B^5$, extending beyond the opposite ends of slot $B^4$. As will be explained more fully hereinafter, the ends of this block or elongated guide projection act in connection with the latch and notches or offsets $a$ and $a'$ in the base in the same way as the separate guide-lugs shown in the other latch.

Lying in the recess $A'$ in the base is the rotary piece D, which, as will be seen, forms a turn-table or carrying-plate. In the form of fastener shown in Figs. 2 to 9, inclusive, with the two guide lugs or projections on the latch, this rotary piece has the two opposite notches, $d$ and $d'$, for engaging the latch-lugs. These notches are of such length or extend inward on the plate far enough so as to allow longitudinal movement of the latch either way to carry one lug or the other outward beyond the edge of the plate—that is, each notch is of sufficient length to allow the latch-guiding lug engaging it sufficient inward play to let the other latch-lug move outward to project beyond the opposite edge of the piece. The piece D, being placed loosely in the recess $A'$, is capable of rotating therein, but is to be limited to a one-quarter revolution either by a pin, $a^2$, on the base engaging shoulders or stops $d^3$ $d^3$ on the piece, as in the fastener shown in Figs. 2 to 9, inclusive, or by a lug or projection, $d^4$, on the piece and stop-shoulders $a^3$ $a^3$ on the base, as in the fastener shown in Figs. 10 to 13, inclusive. The notches $d$ and $d'$ in the rotary piece D are so situated that at one end of the quarter-rotation of the piece the notch $d$ shall be opposite the offset $a$ in the base. The quarter-turn of the piece or turn-table from this position will then bring the notch $d'$ around to the offset $a'$ at the side of recess $A'$.

For actuating the latch B, I provide a knob or handle, E, having the pivot-pin F, extending down through the slot $B^4$ in the latch and through central holes in the piece D and base A, and the eccentrically-situated stud or pin $e$, engaging the cam-slot $B^6$ in the latch. This slot is shown as opening into the rear end of the longitudinal slot $B^4$ and extending out in a curved path to one side of such slot; but I do not limit myself to such arrangement. The slot $B^6$ need not communicate with slot $B^4$ and need not have the curved form shown. It can be varied as to its form and its location on the latch; but I prefer the form and location described and shown. The pivot-pin F can be fixed to the base; but I prefer to have the knob or handle E fixed to it and have the pin journaled in a pivot-hole, $a^4$, in the base A. The lower end of the pivot-pin below the pivot-opening in the base can be provided with any desired means for holding the shaft end in place.

In Fig. 3 the pin or shaft is shown as threaded and provided with a nut, $f$, between which and the under face of the base is a concave washer, $f'$. Between such washer and the base is the spiral spring $f^2$, surrounding the pin or shaft and serving by its downward pull on the shaft to hold the parts of the fastener together with some friction.

In Fig. 12 the spring is dispensed with, and the concave washer $f'$, being made a little thinner than that shown in Fig. 3, bears against the under face of the base with sufficient friction without the use of a spring.

In the form of latch represented in Figs. 10 to 14, inclusive, the rotary piece D, forming the turn-table or carrying-plate for use with the latch, having the elongated block for a guide on its lower side, has a straight way across its upper face for receiving and guiding said guide-block on the latch. Such way can be formed by a groove in the upper face of the piece, or, as I prefer, by means of two parallel ribs, $d^2$ $d^2$, on top of the piece. A quarter-turn of the rotary piece D in one direction brings the way around in line with the notch $a$ at the rear side of the recess $A'$, and a quarter-rotation of the piece in the opposite direction brings the way around in line with recess $a'$.

The operation of my fastener is as follows: With the latch swung open and moved longitudinally, so that its guide-lug $B^5$ or the end of its long guide-block engages the notch or offset $a'$ at the side of recess $A'$, the latch is obviously locked from swinging. The eccentric pin or stud $e$ on the knob engages the slot in the latch, so as to hold it in its locked position until the knob is turned. Upon turning the knob in the direction to swing the latch out into fastening position, the pin $e$, engaging the side of the slot $B^6$, first cams the latch longitudinally to disengage its guide-lug from notch or offset $a'$. The other guide-lug or end of the guide-block on the latch then engages the side of recess $A'$ diametrically opposite to offset $a'$. The latch being thus prevented from further longitudinal movement, but being left free to rotate about the pivot-pin F as a center, is by the engagement of the pin $e$ and slot $B^6$ swung outward into position to engage the keeper C. During such swing of the latch the rotary piece D is rotated through its quarter-turn and stopped by the engagement of the stop-pin and shoulder, as set forth hereinbefore. The piece being thus held from further rotation, the swinging of the latch is stopped with the guide-lug $B^5$ or end of the guide-block on the latch in line with the offset $a$. As the latch cannot now swing, but is free to move inward, the action of the knob-pin $e$ cams the latch B directly inward until the guide-lug $B^5$ or end of the guide-block engages the notch or offset $a$, so as to lock the latch from swinging. The pin $e$, traveling in along the slot $B^6$ as the latch is cammed inward, arrives at a point substantially in line with the pivot-pin F and longitudinal slot $B^4$ in the latch, so that it will hold the latch positively locked in its inward position, and no outward pull on the latch can cause the knob to turn. The camming in of the latch not only draws the sash-rails together by the engagement of the hook on the latch with keeper C, but by the engagement of the cam-surface on the latch with the keeper it causes the upper sash to be forced upward and the lower sash to be pressed downward, so as to close both sashes tightly. The meeting-rails of the sashes are then drawn closely together and locked, and the sashes are cammed into and held in their closed positions. Upon turning the knob the other way to unfasten the sashes the pin $e$, engaging slot $B^6$, first cams the latch outward to disengage the latch-guide lug from the notch $a$, and then swings the latch around and back. When the rotary piece D reaches the end of its quarter-turn and is stopped, so as to prevent further swinging of the latch, the pin $e$ cams the latch longitudinally to bring its lug $B^5$ or end of its guide-block into engagement with notch $a'$, so as to lock the latch open.

Having thus described my invention, what I claim is—

1. In a sash-fastener, in combination with a suitable base, the rotary piece thereon forming a turn-table, and the latch having a sliding connection with the piece, substantially as and for the purpose specified.

2. In a sash-fastener, in combination with a suitable base, a swinging and reciprocating latch engaging locking devices on the base and latch to lock the latter when it is reciprocated, and a rotary piece on the base connected with the latch by a sliding connection adapted to allow reciprocation of the latch, substantially as and for the purpose shown.

3. In a sash-fastener, in combination with the base having a latch-locking notch and a curved latch-guiding surface, the latch having a projection to engage the latch-guiding surface and the locking-notch on the base, and a rotary piece provided with suitable guides to confine the latch to reciprocation with reference to the rotary piece, substantially as and for the purpose set forth.

4. In a sash-fastener, in combination with the base having a locking-notch and a curved guiding-surface, the latch having a projection to engage the guiding-surface and locking-notch, a rotary piece on the base having a sliding connection with the latch adapted to allow reciprocation of the latch, but to cause the piece and latch to swing or rotate together, a rotary knob or handle, and a cam slot-and-pin connection between such knob and the latch, substantially as and for the purpose described.

5. In a sash-fastener, in combination with the base having a locking-notch and a curved latch-guiding surface, the latch having a guiding and locking projection and the longitudinal slot, the rotary piece having a radial slot for engaging the projection on the latch, and the pivot-pin, substantially as and for the purpose specified.

6. In combination with the swinging and reciprocating latch provided with the two lugs, the base provided with a curved guiding-surface and a locking-notch to engage one of the lugs on the latch, and a rotary piece on the base provided with the radial slots to engage the two latch-lugs, substantially as and for the purpose set forth.

7. In combination with the swinging and reciprocating latch provided with the two lugs, the base provided with curved guiding-surfaces and locking-notches to engage both of the lugs, and the rotary piece on the base provided with radial slots to engage the lugs, substantially as and for the purpose described.

8. In combination with the swinging and reciprocating latch having the two guiding and locking lugs, the base having the curved guiding-surfaces and locking-notches for engaging the latch-lugs, and the rotary piece on the base provided with opposite radial slots and suitable stop devices to limit the rotation of such piece as it is turned in one direction to bring one of its radial slots opposite one of the locking-notches in the base and in the other direction to bring its other slot around to the other locking-notch, substantially as and for the purpose specified.

9. In combination with the base provided with a circular recess and the two locking-notches, the rotary piece in the recess provided with a radial slot, the latch provided with a longitudinal slot and with a projection engaging the slot in the rotary piece, the pivot-pin passing through the longitudinal slot in the latch, and stops to limit the rotation of the rotary piece, substantially as and for the purpose shown.

10. In combination with the base having the recess with curved walls and the locking notches or offsets from the recess, the rotary piece in the recess provided with the opposite radial notches, suitable stops for limiting the rotation of the piece as it is turned one way or the other to bring its notches in line with one or the other offset or notch in the base, the latch having the two lugs, a rotary knob or handle, and a slot-and-pin connection between the latch and such knob or handle, substantially as and for the purpose described.

11. In a sash-fastener, in combination with a suitable keeper, the latch adapted to be moved longitudinally to fasten the sashes together, having a cam-surface to engage the keeper, so as to force the sashes carrying, respectively, the keeper and latch up and down in opposite directions as the latch is drawn into its fastening position, substantially as and for the purpose described.

12. In a sash-fastener, in combination with the hooked latch having a cam projection on its upper side, the keeper having the upright portion to be engaged by the latch-hook, and an arm or projection to be engaged by the cam projection as the latch is moved to cause the hook to engage the keeper, substantially as and for the purpose specified.

In testimony that I claim the foregoing I have hereunto set my hand this 3d day of February, 1888.

THOMAS S. SMITH.

Witnesses:
WILLIAM FITCH,
GEORGE E. TEW.